(12) United States Patent
Shimomura et al.

(10) Patent No.: US 6,228,282 B1
(45) Date of Patent: May 8, 2001

(54) REFRIGERATOR OIL COMPOSITION

(75) Inventors: Yuji Shimomura; Satoshi Suda; Hiroyuki Hirano, all of Yokohama (JP)

(73) Assignee: Nippon Mitsubishi Oil Corp., Tokyo (JP)

( * ) Notice: Subject to any disclaimer, the term of this patent is extended or adjusted under 35 U.S.C. 154(b) by 0 days.

(21) Appl. No.: 09/377,696

(22) Filed: Aug. 20, 1999

(30) Foreign Application Priority Data

Mar. 26, 1999 (JP) .................................................. 11-083872

(51) Int. Cl.$^7$ ........................................................ C09B 5/04
(52) U.S. Cl. ................................................. 252/68; 252/67
(58) Field of Search .................................................. 252/68

(56) References Cited

U.S. PATENT DOCUMENTS 3,983,289 * 9/1976 Nishizaki et al. .

FOREIGN PATENT DOCUMENTS

3140A * 7/1979 (EP) .
3-128991 5/1991 (JP) .
8-134481 5/1996 (JP) .
9-221690 8/1997 (JP) .
90/12849 1/1990 (WO) .
97/21792 6/1997 (WO) .

* cited by examiner

*Primary Examiner*—Margaret Einsmann
(74) *Attorney, Agent, or Firm*—Finnegan, Henderson, Farabow, Garrett & Dunner, L.L.P.

(57) ABSTRACT

A refrigerating machine oil composition comprising:

(A) an alicyclic polycarboxylic acid ester compound having an alicyclic ring and at least two ester groups represented by formula (1) bonded to adjacent carbon atoms of the alicyclic ring:

$$—COOR^1 \qquad (1)$$

wherein $R^1$ represents a hydrocarbon group having 1–30 carbon atoms, and $R^1$ of each of the ester groups may be the same or different from each other; and (B) at least one epoxy compound selected from a group consisting of glycidyl ester epoxy compounds and alicyclic epoxy compounds.

12 Claims, No Drawings

REFRIGERATOR OIL COMPOSITION

BACKGROUND OF THE INVENTION

1. Field of the Invention

The present invention relates to a refrigerating machine oil composition, particularly relates to a refrigerating machine oil composition characterized in containing a specific alicyclic polycarboxylic acid ester compound and a specific epoxy compound.

2. Related Background Art

Owing to the restriction of fluorocarbons for prevention of ozone layer destruction and prevention of global warming, efforts are being made to replace chlorine-containing refrigerants such as CFC (chlorofluorocarbon) and HCFC (hydrochlorofluorocarbon) with HFC (hydrofluorocarbon), and to realize high efficiency of a refrigerating system. On the other hand, since HFC refrigerants are also the objects under the restriction for preventing global warming, the application of natural refrigerants such as carbon dioxide, ammonia, hydrocarbons have been researched.

In accordance with the efforts to substitute the above-mentioned refrigerants for the conventional refrigerants, various refrigerating machine oils have been developed. These refrigerating machine oils must satisfy a number of performance requirements including lubricity, refrigerant miscibility, heat stability/hydrolysis resistance, electric insulating ability, low hygroscopicity and the like. Therefore, the compounds contained in the refrigerating machine oils are selected to meet the required performances on the basis of the type and the use of the refrigerants. For example, refrigerating machine oils for HFC refrigerants may contain oxygen compounds such as esters, ethers and carbonates that are miscible with the refrigerant, or they may contain alkylbenzene having inferior miscibility with the refrigerant but having excellent lubricity, heat stability and hydrolysis resistance.

In order to achieve a high efficiency of a refrigerating system, the efforts have been made to lower the viscosity of the refrigerating machine oil. The ester refrigerating machine oils, such as polyol ester obtained from the reaction between an aliphatic polyhydric alcohol and a fatty acid, are disclosed in Japanese Translation Publication No. Hei 3-505602 (JP-A 3-505602) of International Publication for Patent Application and Japanese Patent Kokai (Laid-Open) Publication No. Hei 3-128991 (JP-A 3-128991). One effective means for lowering viscosity of such kinds of ester refrigerating machine oils is to select a fatty acid having a small number of carbon atoms in its alkyl group. However, in general, an ester obtained from a fatty acid with a small alkyl group would have low heat stability and hydrolysis resistance.

Japanese Patent Kokai (Laid-Open) Publication No. Hei 9-221690 (JP-A 9-221690) discloses an alicyclic polycarboxylic acid ester which is an ester refrigerating machine oil having excellent heat stability and hydrolysis resistance. However, even the ester having this structure has not sufficient heat stability and hydrolysis resistance when the viscosity thereof is lowered.

Further, it is generally known that hydrolysis resistance can be improved by incorporating an acid scavenger into an ester refrigerating machine oil. However, the majority of acid scavengers used in conventional ester refrigerating machine oils have substantially no effect or insufficient effect on alicyclic polycarboxylic acid esters.

Therefore, an ester refrigerating machine oil that has both low viscosity for obtaining a high efficiency and high heat stability/hydrolysis resistance, and can also satisfy other required performances has not be developed yet.

SUMMARY OF THE INVENTION

The present invention has been accomplished to solve the above-mentioned technical problems. Therefore, an object of the present invention is to provide a refrigerating machine oil composition having excellent lubricity, refrigerant miscibility, heat stability/hydrolysis resistance, electric insulating ability and other performances, and can achieve a high efficiency of a refrigerating system when it is used together with an HFC refrigerant or a natural refrigerant such as carbon dioxide and hydrocarbon.

As the results of intensive researches conducted by the present inventors to achieve the above described object, it is found that an excellent refrigerating machine oil composition having the above-mentioned various performances can be obtained by blending a specific epoxy compound into a base oil containing a specific ester oil.

The refrigerating machine oil composition according to the present invention comprises:

(A) an alicylic polycarboxylic acid ester compound having an alicyclic ring and at least two ester groups represented by formula (1) bonded to adjacent carbon atoms of the alicyclic ring:

—COOR$^1$            (1)

wherein R$^1$ represents a hydrocarbon group having 1–30 carbon atoms, and R$^1$ of each of the ester groups may be the same or different from each other; and (B) at least one epoxy compound selected from the group consisting of glycidyl ester epoxy compounds and alicyclic epoxy compounds.

The alicylic polycarboxylic acid ester compound has preferably two ester groups represented by the formula (1). Further, the refrigerating machine oil composition according to the present invention preferably further comprises a phosphorus compound.

A fluid composition for refrigerating machines according to the present invention comprises the above-described refrigerating machine oil composition according to the present invention and a chlorine-free fluorocarbon.

DESCRIPTION OF THE PREFFERRED EMBODIMENTS

The best modes for carrying out the present invention will be explained in detail hereinafter.

The alicylic polycarboxylic acid ester compound according to the present invention has an alicyclic ring and at least two ester groups represented by formula (1) bonded adjacent carbon atoms of the alicyclic ring:

—COOR$^1$            (1)

wherein R$^1$ represents a hydrocarbon group having 1–30 carbon atoms, and R$^1$ of each of the ester groups may be the same or different from each other.

Here, the examples of the alicyclic ring include cyclopentane ring, cyclopentene ring, cyclohexane ring, cyclohexene ring, cycloheptane ring, cycloheptene ring, etc., among which cyclohexane ring and cyclohexene ring are preferable. Further, cyclohexane ring is preferable since the rise of its viscosity is small in the use for a long term or under severe conditions, whereas cyclohexene ring is preferable since the rise of its total acid value is small in the use for a long term or under severe conditions.

In addition to the alicyclic ring, the alicyclic polycarboxylic acid ester compound must have at least two ester groups represented by formula (1). The carboxylic acid ester compound only having one ester group is not preferable since its miscibility with the refrigerant and heat stability/hydrolysis resistance are insufficient. Further, there is no particular restriction on the number of the ester groups, however, when taking into consideration the low temperature fluidity, the carboxylic acid ester compound has preferably 4 or less, more preferably 3 or less, and the most preferably 2 ester groups.

Further, the at least two ester groups represented by formula (1) must be bonded to adjacent carbon atoms of the alicyclic ring. The carboxylic acid ester compound, wherein the ester groups are not bonded to adjacent carbon atoms of the alicyclic ring, is not preferable since its heat stability/hydrolysis resistance is insufficient.

There is no particular restriction on the stereo configuration of the ester groups. For example, if the carboxylic acid ester compound has two ester groups represented by formula (1), these two ester groups may be in cis- or trans-form. However, when consideration is given to heat stability and hydrolysis resistance, cis-form is preferable, whereas when consideration is given to both heat stability/hydrolysis resistance and lubricity, trans-form is preferable.

$R^1$ in formula (1) is a hydrocarbon group having 1–30, preferably 2–24 and more preferably 3–18 carbon atoms. The hydrocarbon group mentioned here includes alkyl groups, alkenyl groups, cycloalkyl groups, alkyl cycloalkyl groups, aryl groups, alkyl aryl groups, aryl alkyl groups and so on. Among these groups, alkyl groups, cycloalkyl groups and alkyl cycloalkyl groups are preferable due to their high heat stability and hydrolysis resistance.

The alkyl groups may be straight or branched chain alkyl groups. The examples of the alkyl groups having 3 to 18 carbon atoms include straight or branched chain propyl group, straight or branched chain butyl group, straight or branched chain pentyl group, straight or branched chain hexyl group, straight or branched chain heptyl group, straight or branched chain octyl group, straight or branched chain nonyl group, straight or branched chain decyl group, straight or branched chain undecyl group, straight or branched chain dodecyl group, straight or branched chain tridecyl group, straight or branched chain tetradecyl group, straight or branched chain pentadecyl group, straight or branched chain hexadecyl group, straight or branched chain heptadecyl group, straight or branched chain octadecyl group, etc.

For the straight chain alkyl groups, those having 5 or more carbon atoms are preferable from the point of heat stability and hydrolysis resistance, whereas those having 18 or less carbon atoms are preferable from the point of refrigerant miscibility. Further, for the branched chain alkyl groups, those having 3 or more carbon atoms are preferable from the point of heat stability and hydrolysis resistance, whereas those having 18 or less carbon atoms are preferable from the point of refrigerant miscibility.

The examples of the cycloalkyl groups include cyclopenthyl group, cyclohexyl group, cycloheptyl group and the like, among which, cyclohexyl group is preferable from the point of heat stability/hydrolysis resistance. As to the alkyl cycloalkyl groups wherein an alkyl group is bonded to a cycloalkyl group, a group wherein an alkyl group is bonded to a cyclohexyl group is preferable from the point of heat stability/hydrolysis resistance. Furthermore, the alkyl cycloalkyl groups each having 6 or more carbon atoms are preferable from the point of heat stability and hydrolysis resistance, whereas those each having 10 or less carbon atoms are preferable from the points of refrigerant miscibility and low temperature fluidity.

Furthermore, as a matter of course, the alicyclic polycarboxylic acid ester compound may have one or more hydrocarbon groups bonded to carbon atoms of its alicyclic ring. Such hydrocarbon groups are preferably alkyl groups, and particularly preferably methyl group.

The alicyclic polycarboxylic acid ester compound according to the present invention having the above-described structure is prepared by employing a conventional method to esterifying predetermined acid and alcohol components preferably in the atmosphere of an inert gas such as nitrogen, or in the atmosphere of an esterification catalyst, or by heating the reactants without using a catalyst. Here, the compounds obtained from the esterification without using any catalyst are preferably from the viewpoints of heat stability/hydrolysis resistance and electric insulating ability.

The acid component for the alicyclic polycarboxylic acid ester compound may be a cycloalkane polycarboxylic acid, a cycloalkene polycarboxylic acid, or an acid anhydride thereof that can form an ester compound having at least two ester groups bonded to the adjacent carbon atoms of the alicyclic ring. These acid components can be used singly or jointly as a mixture including two or more of said acids. For example, 1,2-cyclohexanedicarboxylic acid, 4-cyclohexene-1,2-dicarboxylic acid, 1-cyclohexene-1,2-dicarboxylic acid, 3-methyl-1,2-cyclohexanedicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid, 1,2,4-cyclohexane tricarboxylic acid, 1,2,4,5-cyclohexane tetracarboxylic acid and acid anhydrides thereof are disclosed. Among these acids, 1,2-cyclohexanedicarboxylic acid, 3-methyl-1,2-cyclohexanedicarboxylic acid, 4-methyl-1,2-cyclohexanedicarboxylic acid, 1,2,4-cyclohexane tricarboxylic acid, 1,2,4,5-cyclohexane tetracarboxylic acid and the acid anhydrides thereof are preferable from the viewpoint of restraining the rise of viscosity when the ester compounds prepared from these acids are used for a long term or under severe conditions. On the other hand, 4-cyclohexene-1,2-dicarboxylic acid, 1-cyclohexene-1,2-dicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid and the acid anhydrides thereof are preferable from the viewpoint of restraining the rise of total acid value in the use for a long term or under severe conditions.

There is no particular limit to the method for preparing the alicyclic polycarboxylic acids and the acid anhydrides thereof, and the acids or the acid anhydrides obtained by any method can be used. For example, cis-4-cyclohexene-1,2-dicarboxylic acid can be obtained from the reaction between butadiene and maleic acid anhydride in a benzene solvent at 100° C.

The alcohol component for the alicyclic polycarboxylic acid ester compound may be selected from straight chain alcohols having 3–18 carbon atoms, branched chain alcohols having 3–18 carbon atoms, and cycloalcohols having 5–10 carbon atoms, for example, straight or branched chain propanol (n-propanol, 1-methylethanol, etc.), straight or branched chain butanol (n-butanol, 1-methylpropanol, 2-methylpropanol, etc.), straight or branched chain pentanol (n-pentanol, 1-methylbutanol, 2-methylbutanol, 3-methylbutanol, etc.), straight or branched chain hexanol (n-hexanol, 1-methylpentanol, 2-methylpentanol, 3-methylpentanol, etc.), straight or branched chain heptanol (n-heptanol, 1-methylhexanol, 2-methylhexanol, 3-methylhexanol, 4-methylhexanol, 5-methylhexanol, 2,4-dimethylpentanol, etc.), straight or branched chain octanol (n-octanol, 2-ethylhexanol, 1-methylheptanol, 2-methylheptanol, etc.), straight or branched chain nonanol (n-nonanol, 1-methyloctanol, 3,5,5-trimethylhexanol, 1-(2'-methylpropyl)-3-methylbutanol, etc.), straight or branched chain decanol (n-decanol, iso-decanol, etc.), straight or branched chain undecanol (n-undecanol, etc.), straight or branched chain dodecanol (n-dodecanol, iso-dodecanol, etc.), straight or branched chain tridecanol, straight or branched chain tetradecanol (n-tetradecanol, iso-tetradecanol, etc.), straight or branched chain pentadecanol, straight or branched chain hexadecanol (n-hexadecanol, iso-hexadecanol, etc.), straight or branched chain heptadecanol, straight or branched chain octadecanol (n-octadecanol, iso-octadecanol, etc.), cyclohexanol, methylcyclohexanol, dimethylcyclohexanol, etc.

The amount of the alcohol component in the esterification is, for example, 1.0 to 1.5 equivalencies, preferably 1.05 to 1.2 equivalencies with respect to 1 equivalency of acid.

Further, the alicyclic polycarboxylic acid ester compound can also be obtained by transesterification using lower alcohol esters of the above-mentioned acids and/or acetic esters or propionic esters of corresponding alcohols instead of the above-mentioned acid and alcohol components.

The examples of the esterification catalysts include Lewis acids (e.g., aluminum derivatives, tin derivatives, titanium derivatives, etc.); alkali metal salts (e.g., sodium alkoxides, potassium alkoxides, etc.); and sulfonic acids (e.g., para-toluenesulfonic acid, methanesulfonic acid, sulfuric acid, etc.). The amount of the catalyst to be used is, for example, about 0.1 to 1% by mass of the total amount of the raw materials including the acid and alcohol components.

The temperature for esterification is, for example, 150° C. to 230° C., and the time for completing the reaction is generally 3 to 30 hours.

After the esterification, the excessive raw materials are removed by vacuum distillation or atmospheric distillation. Subsequently, the ester compound is refined with a conventional refining method such as liquid-liquid extraction, vacuum distillation, or adsorption refining methods such as activated carbon treatment.

Further, the alicyclic polycarboxylic acid ester compound according to the present invention can also be obtained by the nuclear-hydrogenation of a corresponding aromatic polycarboxylic acid ester compound.

There is no particular restriction on the content of the alicyclic polycarboxylic acid ester compound in the refrigerating machine oil composition according to the present invention. However, in order to make the alicyclic polycarboxylic acid ester compound exhibit its various performances, the content thereof is preferably 5% by mass or more, more preferably 10% by mass or more, furthermore preferably 30% by mass or more, and the most preferably 50% by mass or more, of the total amount of the refrigerating machine oil composition.

The alicyclic polycarboxylic acid ester compound in the refrigerating machine oil composition according to the present invention is principally used as a base oil. As the base oil of the refrigerating machine oil composition according to the present invention, the alicyclic polycarboxylic acid ester compound may be used singly or in combination with an oxygen-containing synthetic oil such as esters (for example, polyol esters, complex esters, etc.) other than the alicylic polycarboxylic acid esters specified in the present invention, polyglycols, polyvinyl ethers, ketones, polyphenyl ethers, silicone, polysiloxanes, or perfluoro ethers.

There is no particular restriction on the amount of the oxygen-containing synthetic oil to be incorporated into the refrigerating machine oil composition. However, in order to improve thermal efficiency and attain heat stability/hydrolysis resistance of the refrigerating machine oil, the content of the oxygen-containing synthetic oil is preferably not more than 150 parts by weight and more preferably not more than 100 parts by weight with respect to 100 parts by weight of the alicyclic polycarboxylic acid ester compound.

The component (B), an epoxy compound, according to the present invention is at least one epoxy compound selected from a group consisting of:
(1) glycidyl ester epoxy compounds; and
(2) alicyclic epoxy compounds.

(1) Glycidyl ester epoxy compounds are the compounds may be concretely exemplified by the compounds represented by formula (2):

(2)

wherein R is a hydrocarbon group having 1 to 18 carbon atoms.

In formula (2), the hydrocarbon group having 1–18 carbon atoms represented by R is, for example, an alkyl group having 1–18 carbon atoms; an alkenyl group having 2–18 carbon atoms; a cycloalkyl group having 5–7 carbon atoms; an alkylcycloalkyl group having 6–18 carbon atoms; an aryl group having 6–10 carbon atoms; an alkylaryl group having 7–18 carbon atoms; and an arylalkyl group having 7–18 carbon atoms, among which an alkyl group having 5–15 carbon atoms; an alkenyl group having 2–15 carbon atoms; a phenyl group; and an alkylphenyl group having an alkyl group having 1–4 carbon atoms are preferable.

The preferable examples of glycidyl ester epoxy compounds include glycidyl-2,2-dimethyloctanoate, glycidyl benzoate, glycidyl-tert-butyl benzoate, glycidyl acrylate, glycidyl methacrylate and the like.

(2) Alicyclic epoxy compounds are represented by formula (3) wherein the carbon atoms forming an epoxy group directly constitute an alicyclic ring:

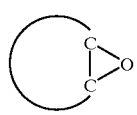

(3)

Alicyclic epoxy compounds can be concretely exemplified by 1,2-epoxycyclohexane, 1,2-epoxycyclopentane, 3,4-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0])heptane, 4-(1'-methylepoxyethyl)-1,2-epoxy-2-methylcyclohexane, 4-epoxyethyl-1,2-epoxycyclohexane and the like.

Epoxy compounds other than those listed above are not preferable since the heat stability and hydrolysis resistance cannot be improved even they are used in the refrigerating machine oil composition comprising the foregoing alicyclic polycarboxylic acid ester compound as the base oil.

The content of the epoxy compound in the refrigerating machine oil composition according to the present invention is not particularly limited, whereas in general the content of the epoxy compound is preferably within a range of 0.1 to 5.0% by mass and more preferably within a range of 0.2 to 2.0% by mass, of the total amount of the refrigerating machine oil composition (i.e., the total amount of the base oil and all incorporated additives).

As a matter of course, two or more kinds of the above-listed epoxy compounds may be used jointly.

The refrigerating machine oil composition according to the present invention is formed by incorporating the specific epoxy compound(s) into the base oil containing the alicyclic polycarboxylic acid ester compound. The refrigerating machine oil composition according to the present invention can be suitably used without any other additives, or, if required, used with various additives incorporated therein.

In order to further improve the wear resistance and load capacity of the refrigerating machine oil composition according to the present invention, at least one phosphorus compound selected from a group consisting of phosphoric esters, acidic phosphoric esters, amine salts of acidic phosphoric esters, chlorinated phosphoric esters and phosphorous esters can be incorporated into the refrigerating machine oil composition according to the present invention. These phosphorus compounds are esters of phosphoric acid or phosphorous acid and an alkanol or a polyether type alcohol; or are derivatives thereof.

Specifically, the phosphoric esters include, for example, tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylyl phosphate, cresyl diphenyl phosphate, xylyl diphenyl phosphate and the like. The acidic phosphoric esters include, for example, monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, dioleyl acid phosphate and the like. The amine salts of acidic phosphoric esters include, for example, salts of the above acidic phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters include, for example, tris dichloropropyl phosphate, tris chloroethyl phosphate, tris chlorophenyl phosphate, polyoxyalkylene bis [di(chloroalkyl)] phosphate and the like. The phosphorous esters include, for example, dibutyl phosphite, dipentyl phosphite, dihexyl phosphite, diheptyl phosphite, dioctyl phosphite, dinonyl phosphite, didecyl phosphite, diundecly phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, tricresyl phosphite and the like. The mixtures of the above compounds can be used.

In a case where these phosphorus compounds are incorporated into the refrigerating machine oil composition according to the present invention, the amount of the phosphorus compounds to be incorporated is not particularly limited, whereas in general the content of the incorporated phosphorus compounds is preferably within a range of 0.01 to 5.0% by mass and more preferably within a range of 0.02 to 3.0% by mass, of the total amount of the refrigerating machine oil composition (i.e., the total amount of the base oil and all incorporated additives).

In order to further improve the wear resistance and load capacity of the refrigerating machine oil composition according to the present invention, a sulfur-containing additive can be incorporated into the refrigerating machine oil composition according to the present invention. The example of such a sulfur additive include phosphorothionates, sulfides, thiocarbonates and zinc thiophosphates.

Phosphorothionates are represented by formula (4)

$$(R^2O)_3P=S \qquad (4)$$

wherein each $R^2$ represents an alkyl group, an aryl group or a phenyl group, $R^2$ may be the same or different from each other.

Such phosphorothionates include, for example, trialkylphosphorothionates, triphenylphosphorothionate, alkyldiarylphosphorothionates, etc.

Sulfides include, for example, diphenylsulfide, diphenyldisulfide, di-n-butylsulfide, di-n-butyldisulfide, di-tert-dodecyldisulfide, di-tert-dodecyl trisulfide and the like. Thiocarbonates include, for example, xanthic disulfide. Zinc thiophosphates include, for example, zinc primary alkylthiophosphate, zinc secondary alkylthiophospahte, zinc arylthiophosphate and the like.

Among the above-mentioned sulfur additive, phosphorothionates are preferable from the viewpoints of wear resistance, load capacity and heat stability/hydrolysis resistance, and among the phosphorothionates, triphenylphosphorothionate is the most preferable.

When the sulfur additive is incorporated into the refrigerating machine oil composition according to the present invention, the amount of the sulfur additive to be incorporated is not particularly limited. However, when consideration is given to the wear resistance and the load capacity, the amount of the sulfur additive is preferably not less than 0.1% by mass, more preferably not less than 0.5% by mass, and further more preferable not less than 1.0% by mass, of the total amount of the refrigerating machine oil composition (i.e., the total amount of the base oil and all incorporated additives). Further, when the consideration is given to the heat stability/hydrolysis resistance, the amount of sulfur additive to be incorporated is preferably not more than 50% by mass, more preferably not more than 30% by mass, and further more preferable not more than 10% by mass.

Further, in order to improve the performances of the refrigerating machine oil composition according to the present invention, it may be incorporated, as required, with heretofore known additives for a refrigerating machine oil, for example, phenol-type antioxidants such as di-tert-butyl-p-cresol and bisphenol A; amine-type antioxidants such as phenyl-α-naphthylamine and N,N-di(2-naphthyl)-p-phenylenediamine; extreme pressure agents such as chlorinated paraffin; oiliness improvers such as fatty acids; antifoaming agents such as silicone-type ones; metal inactivators such as benzotriazole; viscosity index improvers; pour-point depressants; detergent dispersants and so on. These additives may be incorporated into the refrigerating machine oil singly or jointly. The total amount of the additives added into the refrigerating machine oil is not particularly limited, whereas in general the content thereof is preferably not more than 10% by mass and more preferably not more than 5% by mass, of the total amount of the refrigerating machine oil composition(i.e., the total amount of the base oil and all incorporated additives).

The kinematic viscosity of the refrigerating machine oil of the present invention is not particularly limited, whereas the kinematic viscosity at 40° C. can preferably be within a range of 3 to 100 mm$^2$/s, more preferably 4 to 50 mm$^2$/s and the most preferably 5 to 40 mm$^2$/s. Further, the kinematic viscosity at 100° C. can preferably be within a range of 1 to 20 mm$^2$/s and more preferably 2 to 10 mm$^2$/s. Further, one of the effects achieved by the present invention is that good heat stability/hydrolysis resistance can be obtained even when an ester having a low viscosityisused. Such effect is more remarkably achieved in the case where the kinematic viscosity at 40° C. is preferably within a range of 5 to 35 mm$^2$/s, more preferably 5 to 25 mm$^2$/s, furthermore preferably 5 to 20 mm$^2$/s, and the most preferably 5 to 15 mm$^2$/s.

Further, the volume resistivity of the refrigerating machine oil composition according to the present invention is not particularly limited, whereas it can preferably be not less than $1.0 \times 10^{11}$ Ω·cm, more preferably not less than $1.0 \times 10^{12}$ Ω·cm and the most preferably not less than $1.0 \times 10^{13}$ Ω·cm. Particularly, in a case when the refrigerating machine oil composition is used for a hermetic type refrigerating machine, high electric insulating ability tends to become requisite. In the present invention, the volume resistivity is represented by the value at 25° C. measured in accordance with JIS C 2101 "Electric Insulating Oil Testing Method."

The content of water in the refrigerating machine oil composition according to the present invention is not particularly limited, whereas it can preferably be 200 ppm or less, more preferably 100 ppm or less, and the most preferably 50 ppm or less, of the total amount of the refrigerating machine oil composition. Particularly, when the refrigerating machine oil composition is used for a hermetic type refrigerating machine, a low water content is required due to its effects on the heat stability/hydrolysis resistance and electric insulating ability of the oil.

Further, the total acid value of the refrigerating machine oil composition according to the present invention is not particularly limited. However, when the oil composition is used in a refrigerating machine or pipes for preventing metals from corrosion, the total acid value can preferably be 0.1 mgKOH/g or less, and more preferably 0.05 mgKOH/g or less. In the present invention, the total acid value is represented by the value of the total acid value measured in accordance with JIS C 2501 "Petroleum Products and Lubricating Oils—Neutralization Value Testing Method".

The content of ash in the refrigerating machine oil composition according to the present invention is not particularly limited, whereas, in order to improve the heat stability/hydrolysis resistance of the oil and suppress the generation of sludge or the like, it can preferably be 100 ppm or less, and more preferably 50 ppm or less. In the present invention, the ash content is represented by the value of the ash content measured in accordance with JIS C 2272 "Testing Method for Ash Content and Sulfuric Acid Ash Content in Crude Oil and Petroleum Product".

The refrigerants to be used in the refrigerating machine wherein the refrigerating machine oil composition according to the present invention is used may be HFC refrigerants, fluorine-containing ether refrigerants such as perfluoroethers; fluorine-free ether refrigerants such as dimethyl ethers; and natural refrigerants such as carbon dioxide, hydrocarbons and so on. The refrigerants can be used singly or jointly as a mixture including two or more kinds of the refrigerants.

HFC refrigerants are, for example, hydrofluocarbons having 1–3 and preferably 1 or 2 carbon atoms, for example, difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) or a mixture of two or more kinds of these HFCs. The refrigerant is selected in accordance with the use and the requisite performances. For example, single HFC-32; single HFC-23; single HFC-134a; single HFC-125, a mixture of HFC-134a/HFC-32=60–80% by mass/40–20% by mass; a mixture of HFC-32/HFC-125=40–70% by mass/60–30% by mass; a mixture of HFC-125/HFC-143a=40–60% by mass/60–40% by mass; a mixture of HFC-134a/HFC-32/HFC-125=60% by mass/30% by mass/10% by mass; a mixture of HFC-134a/HFC-32/HFC-125=40–70% by mass/15–35% by mass/5–40% by mass; and a mixture of HFC-125/HFC-134a/HFC-143a=35–55% by mass/1–15% by mass/40–60% by mass are preferable. More specific examples include a mixture of HFC-134a/HFC-32=70/30% by mass, a mixture of HFC-32/HFC-125=60/40% by mass; a mixture of HFC-32/HFC-125=50/50% by mass (R410A); a mixture of HFC-32/HFC-125=45/55% by mass (R410B); a mixture of HFC-125/HFC-143a=50/50% by mass (R507C); a mixture of HFC-32/HFC-125/HFC-134a=30/10/60% by mass; a mixture of HFC-32/HFC-125/HFC-134a=23/25/52% by mass (R407C); a mixture of HFC-32/HFC-125/HFC-134a=25/15/60% by mass (R407E); and a mixture of HFC-125/HFC-134a/HFC-143a=44/4/52% by mass (R404A).

Further, the example of the natural refrigerants include carbon dioxide, hydrocarbons, etc. The hydrocarbon refrigerant used here is preferably a gas at 25° C. under 1 atm, for example, alkane, cycloalkane or alkene having 1 to 5 carbon atoms and preferably 1 to 4 carbon atoms or a mixture thereof. The examples of the hydrocarbon refrigerant include methane, ethylene, ethane, propylene, propane, cyclopropane, butane, isobutane, cyclobutane, methylcyclopropane and the mixtures of two or more kinds of these compounds, among which propane, butane, isobutane and the mixtures thereof are preferable.

The refrigerating machine oil composition according to the present invention normally exists in the form of a fluid composition for a refrigerating machine mixed with a refrigerant as describe above when it is used in the refrigerating machine. The ratio of the refrigerating machine oil composition to the refrigerant is not particularly limited, whereas the amount of the refrigerating machine oil composition is preferably within a range of 1 to 500 parts by weight and more preferably within a range of 2 to 400 parts by weight per 100 parts by weight of the refrigerant.

The refrigerating machine oil composition according to the present invention can be used as a lubricating oil for refrigerant compressors in all types of refrigerating machines, since the present refrigerating machine oil composition has excellent electric characteristic and a low hygroscopicity. Such refrigerating machines in which the present refrigerating machine oil composition is used can be concretely exemplified by an air conditioner for rooms, a package air conditioner, a cold-storage chest (refrigerator), an air conditioner for vehicles, a dehumidifier, a freezer, a freeze and refrigeration warehouse, an automatic vending machine, a showcase, a cooling apparatus in chemical plants and so on. Further, the refrigerating machine oil composition according to the present invention is particularly preferable to be used in refrigerating machines having a hermetic compressor. Furthermore, the refrigerating machine oil composition according to the present invention can be used in all types of compressors including a reciprocating type one, a rotating type one and a centrifugal type one. Furthermore, the refrigerating machine oil composition according to the present invention can be used as a lubricating oil for the purpose of bettering the initial running-in of a sliding member in a refrigerant compressor.

EXAMPLES

The present invention will be explained in detail by the following Examples and Comparative Examples, but the present invention is not limited to these Examples.

Examples 1–22 and

Comparative Examples 1–16

The following base oils and additives were blended in the proportions shown in Tables 1–10 to prepare sample oils of Examples 1–22 and Comparative Examples 1–16, respectively. The properties of each of the obtained sample oils are shown in Tables 1–10 (kinematic viscosities at 40° C. and 100° C., total acid value).
(Base Oils)
Base oil 1: 1,2-cyclohexanedicarboxylic acid diisoheptyl
Base oil 2: 1,2-cyclohexanedicarboxylic acid di(2-ethylhexyl)
Base oil 3: 1,2-cyclohexanedicarboxylic acid di(3,5,5-trimethyl hexyl)
Base oil 4: 1,2-cyclohexanedicarboxylic acid di(2,6-dimethyl-4-heptyl)
Base oil 5: 1,2-cyclohexanedicarboxylic acid diisodecyl
Base oil 6: 4-cyclohexene-1,2-dicarboxylic acid diisoheptyl
Base oil 7: 4-cyclohexene-1,2-dicarboxylic acid di(2-ethylhexyl)
Base oil 8: 4-cyclohexene-1,2-dicarboxylic acid di(3,5,5-trimethylhexyl)
Base oil 9: tetraester of pentaerythritol and an aliphatic acid mixture consisting of 2-ethylhexanoic acid and 3,5,5-trimethylhexanoic acid (weight ratio=50:50)
Base oil 10: tetraester of pentaerythritol and an aliphatic acid mixture consisting of n-pentanoic acid, n-heptanoic acid and 3,5,5-trimethylhexanoic acid (weight ratio=50:30:20)
Base oil 11: copolymer of vinyl ethyl ether and vinyl butyl ether (ethyl/isobutyl=7:1, average molecular weight: 900)
(Additives)
Additive 1: glycidyl-2,2-dimethyloctanoate
Additive 2: cyclohexeneoxide
Additive 3: phenylglycidylether Next, the following tests were carried out in respect to each of the above-described sample oils.
(Refrigerant Miscibility Test)
In accordance with "Refrigerant Miscibility Testing Method" of JIS-K-2211 "Refrigerating machine Oil," 1 g of each of the sample oils was blended with 29 g of HFC 134a refrigerant to observe whether the sample oils and the refrigerant were miscible with each other at 0° C., or separate from each other or in the state of a white suspension. The results are shown in Tables 1–10.
(Electric Insulating Ability Test)
The volume resistivity at 25° C. of each of the sample oils was measured in accordance with JIS-C-2101 "Electric Insulating Oil Testing Method." The results are shown in Tables 1–10.
(Heat Stability/Hydrolysis Resistance Test)
90 g of each of the sample oils wherein the water content had been adjusted to 1000 ppm were weighted and sealed in an autoclave together with 10 g of HFC 134a refrigerant and catalysts (iron, copper and aluminum wires), and subsequently heated at 200° C. 2000 hours later, the appearances of the sample oils and the appearance of the catalysts were observed, and the volume resistivity of each of the sample oils and the total acid values of the sample oils were measured. The results are shown in Tables 1–10.
(Lubricity Test)
The sample oils were each applied to a test journal for measuring the amount of the test journal (pin) worn by having the test machine run in at a test oil temperature of 100° C. under a load of 150 lb for 1 minute and then run under a load of 250 lb for 2 hours in accordance with ASTM D 2670 "FALEX WEAR TEST."
The results of the measurement are shown in Tables 1–10.

TABLE 1

|  |  | Example 1 | Example 2 | Example 3 | Example 4 | Example 5 |
|---|---|---|---|---|---|---|
| Base Oil |  | 1 | 2 | 3 | 4 | 5 |
| (% by mass) |  | 99.8 | 99.8 | 99.8 | 99.8 | 99.8 |
| Additive |  | 1 | 1 | 1 | 1 | 1 |
| (% by mass) |  | 0.2 | 0.2 | 0.2 | 0.2 | 0.2 |
| Kinematic | 40° C.(mm²/s) | 12.5 | 18.2 | 28.5 | 25.6 | 29.5 |
| Viscosity | 100° C.(mm²/s) | 2.9 | 3.5 | 4.7 | 4.5 | 4.7 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity (Ω · cm) |  | $2.7 \times 10^{13}$ | $4.6 \times 10^{13}$ | $7.4 \times 10^{13}$ | $8.1 \times 10^{13}$ | $8.3 \times 10^{12}$ |
| Heat Stability/ | Appearance of Sample Oil | No Change | No Change | No Change | No Change | No Change |
| Hydrolysis | Appearance  Cu | Less Glossy | Less Glossy | Less Glossy | Less Glossy | Less Glossy |
| Resistance | of Catalyst  Fe | No Change | No Change | No Change | No Change | No Change |
| Test |               Al | No Change | No Change | No Change | No Change | No Change |
|  | Volume Resistivity (Ω · cm) | $3.6 \times 10^{12}$ | $2.8 \times 10^{12}$ | $1.2 \times 10^{13}$ | $1.0 \times 10^{13}$ | $1.5 \times 10^{12}$ |
|  | Total Acid Value (mgKOH/g) | 0.24 | 0.21 | 0.28 | 0.22 | 0.20 |
| FALEX Test | Amount of Journal Worn (mg) | 22 | 23 | 25 | 23 | 22 |

TABLE 2

|  |  | Example 6 | Example 7 | Example 8 | Example 9 | Example 10 |
|---|---|---|---|---|---|---|
| Base Oil |  | 1 | 2 | 3 | 4 | 5 |
| (% by mass) |  | 99.8 | 99.8 | 99.8 | 99.8 | 99.8 |
| Additive |  | 2 | 2 | 2 | 2 | 2 |
| (% by mass) |  | 0.2 | 0.2 | 0.2 | 0.2 | 0.2 |
| Kinematic | 40° C.(mm$^2$/s) | 12.5 | 18.2 | 28.5 | 25.6 | 29.5 |
| Viscosity | 100° C.(mm$^2$/s) | 2.9 | 3.5 | 4.7 | 4.5 | 4.7 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity (Ω · cm) |  | $2.7 \times 10^{13}$ | $4.6 \times 10^{13}$ | $7.4 \times 10^{13}$ | $8.1 \times 10^{13}$ | $8.3 \times 10^{12}$ |
| Heat Stability/ | Appearance of Sample Oil | No Change | No Change | No Change | No Change | No Change |
| Hydrolysis | Appearance    Cu | Less Glossy | Less Glossy | Less Glossy | Less Glossy | Less Glossy |
| Resistance | of Catalyst     Fe | No Change | No Change | No Change | No Change | No Change |
| Test |                        Al | No Change | No Change | No Change | No Change | No Change |
|  | Volume Resistivity (Ω · cm) | $2.8 \times 10^{12}$ | $1.5 \times 10^{12}$ | $1.0 \times 10^{13}$ | $1.2 \times 10^{13}$ | $1.8 \times 10^{12}$ |
|  | Total Acid Value (mgKOH/g) | 0.22 | 0.25 | 0.19 | 0.20 | 0.25 |
| FALEX Test | Amount of Journal Worn (mg) | 22 | 23 | 25 | 23 | 22 |

TABLE 3

|  |  | Comparative Example 1 | Comparative Example 2 | Comparative Example 3 | Comparative Example 4 | Comparative Example 5 |
|---|---|---|---|---|---|---|
| Base Oil |  | 1 | 2 | 3 | 4 | 5 |
| (% by mass) |  | 99.8 | 99.8 | 99.8 | 99.8 | 99.8 |
| Additive |  | 3 | 3 | 3 | 3 | 3 |
| (% by mass) |  | 0.2 | 0.2 | 0.2 | 0.2 | 0.2 |
| Kinematic | 40° C.(mm$^2$/s) | 12.5 | 18.2 | 28.5 | 25.6 | 29.5 |
| Viscosity | 100° C.(mm$^2$/s) | 2.9 | 3.5 | 4.7 | 4.5 | 47 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity (Ω · cm) |  | $2.7 \times 10^{13}$ | $4.6 \times 10^{13}$ | $7.4 \times 10^{13}$ | $8.1 \times 10^{13}$ | $8.3 \times 10^{12}$ |
| Heat Stability/ | Appearance of Sample Oil | No Change | No Change | No Change | No Change | No Change |
| Hydrolysis | Appearance    Cu | Less Glossy | Less Glossy | Less Glossy | Less Glossy | Less Glossy |
| Resistance | of Catalyst     Fe | No Change | No Change | No Change | No Change | No Change |
| Test |                        Al | No Change | No Change | No Change | No Change | No Change |
|  | Volume Resistivity (Ω · cm) | $7.5 \times 10^{10}$ | $5.8 \times 10^{10}$ | $4.5 \times 10^{10}$ | $2.2 \times 10^{10}$ | $3.0 \times 10^{10}$ |
|  | Total Acid Value (mgKOH/g) | 2.5 | 2.8 | 2.4 | 1.9 | 1.9 |
| FALEX Test | Amount of Journal Worn (mg) | 22 | 23 | 25 | 23 | 22 |

TABLE 4

|  |  | Comparative Example 6 | Comparative Example 7 | Comparative Example 8 | Comparative Example 9 | Comparative Example 10 |
|---|---|---|---|---|---|---|
| Base Oil |  | 1 | 2 | 3 | 4 | 5 |
| (% by mass) |  | 100 | 100 | 100 | 100 | 100 |
| Additive |  | — | — | — | — | — |
| (% by mass) |  |  |  |  |  |  |
| Kinematic | 40° C.(mm$^2$/s) | 12.5 | 18.2 | 28.5 | 25.6 | 29.5 |
| Viscosity | 100° C.(mm$^2$/s) | 2.9 | 3.5 | 4.7 | 4.5 | 4.7 |
| Total Acid Value (mgKOH/g) |  | 0.01 | 0.01 | 0.01 | 0.01 | 0.01 |
| Miscibility |  | Miscible | Miscible | Miscible | Miscible | Miscible |
| Volume Resistivity (Ω · cm) |  | $2.7 \times 10^{13}$ | $4.6 \times 10^{13}$ | $7.4 \times 10^{13}$ | $8.1 \times 10^{13}$ | $8.3 \times 10^{12}$ |
| Heat Stability/ | Appearance of Sample Oil | No Change | No Change | No Change | No Change | No Change |
| Hydrolysis | Appearance    Cu | Less Glossy | Less Glossy | Less Glossy | Less Glossy | Less Glossy |
| Resistance | of Catalyst     Fe | No Change | No Change | No Change | No Change | No Change |
| Test |                        Al | No Change | No Change | No Change | No Change | No Change |
|  | Volume Resistivity (Ω · cm) | $1.2 \times 10^{10}$ | $1.5 \times 10^{10}$ | $8.0 \times 10^{9}$ | $2.0 \times 10^{10}$ | $6.0 \times 10^{9}$ |
|  | Total Acid Value (mgKOH/g) | 5.4 | 4.9 | 5.0 | 4.8 | 4.8 |
| FALEX Test | Amount of Journal Worn (mg) | 22 | 23 | 25 | 23 | 22 |

TABLE 5

|  |  | Example 11 | Example 12 | Example 13 |
|---|---|---|---|---|
| Base Oil |  | 6 | 7 | 8 |
| (% by mass) |  | 99.8 | 99.8 | 99.8 |
| Additive |  | 1 | 1 | 1 |
| (% by mass) |  | 0.2 | 0.2 | 0.2 |
| Kinematic | 40° C.(mm$^2$/s) | 12.8 | 18.9 | 29.5 |

TABLE 5-continued

|  |  | Example 11 | Example 12 | Example 13 |
|---|---|---|---|---|
| Viscosity | 100° C.(mm$^2$/s) | 2.8 | 3.6 | 4.7 |
| Total Acid Value (mgKOH/g) |  | 0.01 | 0.01 | 0.01 |
| Miscibility |  | Miscible | Miscible | Miscible |
| Volume Resistivity (Ω · cm) |  | 3.1 × 10$^{12}$ | 6.1 × 10$^{12}$ | 6.3 × 10$^{12}$ |
| Heat Stability/ | Appearance of Sample Oil | No Change | No Change | No Change |
| Hydrolysis | Appearance Cu | Less Glossy | Less Glossy | Less Glossy |
| Resistance | of Catalyst Fe | No Change | No Change | No Change |
| Test |  Al | No Change | No Change | No Change |
|  | Volume Resistivity (Ω · cm) | 4.3 × 10$^{11}$ | 7.6 × 10$^{11}$ | 8.5 × 10$^{11}$ |
|  | Total Acid Value (mgKOH/g) | 0.35 | 0.28 | 0.25 |
| FALEX Test | Amount of Journal Worn (mg) | 20 | 24 | 22 |

TABLE 6

|  |  | Example 14 | Example 15 | Example 16 |
|---|---|---|---|---|
| Base Oil |  | 6 | 7 | 8 |
| (% by mass) |  | 99.8 | 99.8 | 99.8 |
| Additive |  | 2 | 2 | 2 |
| (% by mass) |  | 0.2 | 0.2 | 0.2 |
| Kinematic | 40° C.(mm$^2$/s) | 12.8 | 18.9 | 29.5 |
| Viscosity | 100° C.(mm$^2$/s) | 2.8 | 3.6 | 4.7 |
| Total Acid Value (mgKOH/g) |  | 0.01 | 0.01 | 0.01 |
| Miscibility |  | Miscible | Miscible | Miscible |
| Volume Resistivity (Ω · cm) |  | 3.1 × 10$^{12}$ | 6.1 × 10$^{12}$ | 6.3 × 10$^{12}$ |
| Heat Stability/ | Appearance of Sample Oil | No Change | No Change | No Change |
| Hydrolysis | Appearance Cu | Less Glossy | Less Glossy | Less Glossy |
| Resistance | of Catalyst Fe | No Change | No Change | No Change |
| Test |  Al | No Change | No Change | No Change |
|  | Volume Resistivity (Ω · cm) | 1.0 × 10$^{11}$ | 1.5 × 10$^{11}$ | 1.0 × 10$^{11}$ |
|  | Total Acid Value (mgKOH/g) | 0.38 | 0.35 | 0.35 |
| FALEX Test | Amount of Journal Worn (mg) | 20 | 24 | 22 |

TABLE 7

|  |  | Comparative Example 11 | Comparative Example 12 | Comparative Example 13 |
|---|---|---|---|---|
| Base Oil |  | 6 | 7 | 8 |
| (% by mass) |  | 99.8 | 99.8 | 99.8 |
| Additive |  | 3 | 3 | 3 |
| (% by mass) |  | 0.2 | 0.2 | 0.2 |
| Kinematic | 40° C.(mm$^2$/s) | 12.8 | 18.9 | 29.5 |
| Viscosity | 100° C.(mm$^2$/s) | 2.8 | 3.6 | 4.7 |
| Total Acid Value (mgKOH/g) |  | 0.01 | 0.01 | 0.01 |
| Miscibility |  | Miscible | Miscible | Miscible |
| Volume Resistivity (Ω · cm) |  | 3.1 × 10$^{12}$ | 6.1 × 10$^{12}$ | 6.3 × 10$^{12}$ |
| Heat Stability/ | Appearance of Sample Oil | No Change | No Change | No Change |
| Hydrolysis | Appearance Cu | Less Glossy | Less Glossy | Less Glossy |
| Resistance | of Catalyst Fe | No Change | No Change | No Change |
| Test |  Al | No Change | No Change | No Change |
|  | Volume Resistivity (Ω · cm) | 1.1 × 10$^{10}$ | 4.6 × 10$^{10}$ | 3.8 × 10$^{10}$ |
|  | Total Acid Value (mgKOH/g) | 1.9 | 1.8 | 1.8 |
| FALEX Test | Amount of Journal Worn (mg) | 20 | 24 | 22 |

TABLE 8

|  |  | Comparative Example 14 | Comparative Example 15 | Comparative Example 16 |
|---|---|---|---|---|
| Base Oil |  | 6 | 7 | 8 |
| (% by mass) |  | 100 | 100 | 100 |
| Additive |  | — | — | — |
| (% by mass) |  |  |  |  |
| Kinematic | 40° C.(mm$^2$/s) | 12.8 | 18.9 | 29.5 |
| Viscosity | 100° C.(mm$^2$/s) | 2.8 | 3.6 | 4.7 |
| Total Acid Value (mgKOH/g) |  | 0.01 | 0.01 | 0.01 |
| Miscibility |  | Miscible | Miscible | Miscible |
| Volume Resistivity (Ω · cm) |  | 3.1 × 10$^{12}$ | 6.1 × 10$^{12}$ | 6.3 × 10$^{12}$ |
| Heat Stability/ | Appearance of Sample Oil | No Change | No Change | No Change |

TABLE 8-continued

|  |  |  | Comparative Example 14 | Comparative Example 15 | Comparative Example 16 |
|---|---|---|---|---|---|
| Hydrolysis Resistance Test | Appearance of Catalyst | Cu | Less Glossy | Less Glossy | Less Glossy |
|  |  | Fe | No Change | No Change | No Change |
|  |  | Al | No Change | No Change | No Change |
|  | Volume Resistivity ($\Omega \cdot cm$) |  | $5.0 \times 10^8$ | $4.6 \times 10^9$ | $1.0 \times 10^9$ |
|  | Total Acid Value (mgKOH/g) |  | 5.2 | 5.0 | 5.2 |
| FALEX Test | Amount of Journal Worn (mg) |  | 20 | 24 | 22 |

TABLE 9

|  |  |  | Example 17 | Example 18 | Example 19 |
|---|---|---|---|---|---|
| Base Oil |  |  | 2 | 2 | 2 |
| (% by mass) |  |  | 49.9 | 49.9 | 49.9 |
| Base Oil |  |  | 9 | 10 | 11 |
| (% by mass) |  |  | 49.9 | 49.9 | 49.9 |
| Additive |  |  | 1 | 1 | 1 |
| (% by mass) |  |  | 0.2 | 0.2 | 0.2 |
| Kinematic | 40° C.(mm²/s) |  | 43.5 | 25.0 | 42.1 |
| Viscosity | 100° C.(mm²/s) |  | 6.0 | 4.7 | 5.8 |
| Total Acid Value (mgKOH/g) |  |  | 0.01 | 0.01 | 0.01 |
| Miscibility |  |  | Miscible | Miscible | Miscible |
| Volume Resistivity ($\Omega \cdot cm$) |  |  | $1.0 \times 10^{14}$ | $2.8 \times 10^{14}$ | $1.0 \times 10^{14}$ |
| Heat Stability/ | Appearance of Sample Oil |  | No Change | No Change | No Change |
| Hydrolysis | Appearance | Cu | No Change | No Change | No Change |
| Resistance | of Catalyst | Fe | No Change | No Change | No Change |
| Test |  | Al | No Change | No Change | No Change |
|  | Volume Resistivity ($\Omega \cdot cm$) |  | $3.3 \times 10^{12}$ | $1.1 \times 10^{13}$ | $1.0 \times 10^{13}$ |
|  | Total Acid Value (mgKOH/g) |  | 0.26 | 0.30 | 0.24 |
| FALEX Test | Amount of Journal Worn (mg) |  | 13 | 14 | 13 |

TABLE 10

|  |  |  | Example 20 | Example 21 | Example 22 |
|---|---|---|---|---|---|
| Base Oil |  |  | 2 | 2 | 2 |
| (% by mass) |  |  | 49.9 | 49.9 | 49.9 |
| Base Oil |  |  | 9 | 10 | 11 |
| (% by mass) |  |  | 49.9 | 49.9 | 49.9 |
| Additive |  |  | 2 | 2 | 2 |
| (% by mass) |  |  | 0.2 | 0.2 | 0.2 |
| Kinematic | 40° C.(mm²/s) |  | 23.5 | 25.0 | 42.1 |
| Viscosity | 100° C.(mm²/s) |  | 4.7 | 4.7 | 5.8 |
| Total Acid Value (mgKOH/g) |  |  | 0.01 | 0.01 | 0.01 |
| Miscibility |  |  | Miscible | Miscible | Miscible |
| Volume Resistivity ($\Omega \cdot cm$) |  |  | $1.0 \times 10^{14}$ | $2.8 \times 10^{14}$ | $1.0 \times 10^{14}$ |
| Heat Stability/ | Appearance of Sample Oil |  | No Change | No Change | No Change |
| Hydrolysis | Appearance | Cu | No Change | No Change | No Change |
| Resistance | of Catalyst | Fe | No Change | No Change | No Change |
| Test |  | Al | No Change | No Change | No Change |
|  | Volume Resistivity ($\Omega \cdot cm$) |  | $33 \times 10^{12}$ | $1.1 \times 10^{13}$ | $1.0 \times 10^{13}$ |
|  | Total Acid Value (mgKOH/g) |  | 0.26 | 0.30 | 0.24 |
| FALEX Test | Amount of Journal Worn (mg) |  | 13 | 14 | 13 |

It is shown clearly by the results stated in Tables 1–10 that the sample oils in Examples 1 to 22 of the refrigerating machine oil composition according to the present invention have the excellent and well-balanced performances including kinematic viscosity, refrigerant miscibility, electric insulating ability, hydrolysis resistance, heat stability and lubricity when it is used together with an HFC refrigerant, compared with the sample oils not containing epoxy compounds or containing epoxy compounds other than the glycidyl ester epoxy compounds or alycyclic epoxy compounds.

As described above, the refrigerating machine oil composition according to the present invention does not only have excellent performances including lubricity, miscibility with refrigerants, heat stability/hydrolysis resistance, electric insulating ability and so on but can also realize high efficiency of a refrigerating system when the refrigerating machine oil composition is used with HFC refrigerants or natural refrigerants such as carbon dioxide, hydrocarbons and so on.

What is claimed is:

1. A fluid composition for refrigeration machines comprising:
   (I) a refrigerating machine oil composition which comprises
      (A) an alicyclic polycarboxylic acid ester compound having an alicyclic ring and at least two ester groups represented by formula —COOR$^1$ bonded to adjacent carbon atoms of the alicyclic ring, wherein R$^1$ represents a hydrocarbon group having 1– 30 carbon atoms, and $R^1$ of each of the ester groups may be the same or different from each other, and (B) at least one epoxy compound selected from a group consisting of glycidyl ester epoxy compounds and alicyclic epoxy compounds; and (II) a refrigerant selected from a group consisting of hydrofluorocarbon refrigerants, fluorine-containing ether refrigerants, fluorine-free ether refrigerants and natural refrigerants.

2. A fluid composition according to claim 1, wherein said alicyclic polycarboxylic acid ester compound has two ester groups represented by said formula.

3. A fluid composition according to claim 1, further comprising a phosphorus compound.

4. A fluid composition according to claim 1, wherein said hydrofluorocarbon refrigerant is chlorine-free.

5. A fluid composition according to claim 1, wherein a content of said alicyclic polycarboxylic acid ester compound is 5% by mass or more of the total amount of the refrigerating machine oil composition.

6. A fluid composition according to claim 1, wherein a content of said alicyclic polycarboxylic acid ester compound is 10% by mass or more of the total amount of the refrigerating machine oil composition.

7. A fluid composition according to claim 1, wherein a content of said alicyclic polycarboxylic acid ester compound is 30% by mass or more of the total amount of the refrigerating machine oil composition.

8. A fluid composition according to claim 1, wherein a content of said alicyclic polycarboxylic acid ester compound is 50% by mass or more of the total amount of the refrigerating machine oil composition.

9. A fluid composition according to claim 1, wherein a content of said epoxy compound ranges from 0.1 to 5.0% by mass of the total amount of the refrigerating machine oil composition.

10. A fluid composition according to claim 1, wherein a content of said epoxy compound ranges from 0.2 to 2.0% by mass of the total amount of the refrigerating machine oil composition.

11. A fluid composition according to claim 1, wherein said alicyclic polycarboxylic acid ester compound is an ester of:

an acid component selected from a group consisting of 1,2-cyclohexanedicarboxylic acid, 4-cyclohexene-1,2-dicarboxylic acid, 1-cyclohexene-1,2-dicarboxylic acid, 3-methyl-1,2-cyclohexanedicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid, 1,2,4-cyclohexane tricarboxylic acid, 1,2,4,5-cyclohexane tetracarboxylic acid and acid anhydrides thereof; and an alcohol component selected from a group consisting of straight chain alcohols having 3–18 carbon atoms, branched chain alcohols having 3–18 carbon atoms, and cycloalcohols having 5–10 carbon atoms.

12. A fluid composition according to claim 1, wherein an amount of said refrigerating machine oil composition ranges from 1 to 500 parts by weight per 100 parts by weight of the refrigerant.

* * * * *